United States Patent
Dasika et al.

(10) Patent No.: US 11,921,784 B2
(45) Date of Patent: Mar. 5, 2024

(54) FLEXIBLE, SCALABLE GRAPH-PROCESSING ACCELERATOR

(71) Applicant: Advanced Micro Devices, Inc., Santa Clara, CA (US)

(72) Inventors: Ganesh Dasika, Austin, TX (US); Michael Ignatowski, Austin, TX (US); Michael J Schulte, Austin, TX (US); Gabriel H Loh, Bellevue, WA (US); Valentina Salapura, Santa Clara, CA (US); Angela Beth Dalton, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 5 days.

(21) Appl. No.: 17/564,413

(22) Filed: Dec. 29, 2021

(65) Prior Publication Data
US 2022/0365975 A1 Nov. 17, 2022

Related U.S. Application Data

(60) Provisional application No. 63/188,175, filed on May 13, 2021.

(51) Int. Cl.
*G06F 15/80* (2006.01)
*G06F 16/901* (2019.01)

(52) U.S. Cl.
CPC ...... *G06F 16/9024* (2019.01); *G06F 15/8046* (2013.01)

(58) Field of Classification Search
CPC .................. G06F 16/9024; G06F 15/8046
See application file for complete search history.

(56) References Cited

U.S. PATENT DOCUMENTS

| 11,003,429 | B1 | 5/2021 | Zejda et al. | |
|---|---|---|---|---|
| 2009/0187733 | A1* | 7/2009 | El-Ghazawi | G06F 15/7867 712/15 |
| 2010/0076915 | A1* | 3/2010 | Xu | G06N 3/063 706/25 |
| 2013/0226535 | A1* | 8/2013 | Tuan | G06F 30/367 703/2 |
| 2019/0205746 | A1* | 7/2019 | Nurvitadhi | G06F 7/483 |
| 2019/0325005 | A1* | 10/2019 | Greathouse | G06F 17/16 |
| 2020/0225996 | A1* | 7/2020 | Sharma | G06F 15/7889 |
| 2021/0011849 | A1* | 1/2021 | Simpson | G06N 3/045 |
| 2022/0101120 | A1* | 3/2022 | Wang | G06N 3/045 |

OTHER PUBLICATIONS

Gengyu Rao et al: "IntersectX: An Accelerator for Graph Mining", arxiv.org, Cornell University Library, 201 OLIN Library Cornell University Ithaca, NY 14853, Feb. 17, 2021 (Feb. 17, 2021), XP081880245, abstract, figures 1-14, p. 1, left-hand column—p. 11, right-hand column.
International Search Report and Written Opinion, Application No. PCT/US2022/016975 dated Jun. 1, 2022.

(Continued)

*Primary Examiner* — Jorge A Casanova

(57) ABSTRACT

An accelerator device includes a first processing unit to access a structure of a graph dataset, and a second processing unit coupled with the first processing unit to perform computations based on data values in the graph dataset.

21 Claims, 6 Drawing Sheets

(56) References Cited

OTHER PUBLICATIONS

Song Xinkai et al: "Cambricon-G: A Polyvalent Energy-Efficient Accelerator for Dynamic Graph Neural Networks", IEEE Transactions on Computer-Aided Design of Integrated Circuits and Systems, IEEE, USA, vol. 41, No. 1, Jan. 18, 2021 (Jan. 18, 2021), pp. 116-128, XP011895135, ISSN: 0278-0070, DOI: 10.1109/TCAD. 2021.3052138 [retrieved on Dec. 21, 2021] abstract; figures 1-17; p. 118, left-hand column—p. 127, left-hand column.

* cited by examiner

FLEXIBLE, SCALABLE GRAPH-PROCESSING ACCELERATOR

CROSS-REFERENCE TO RELATED APPLICATIONS

This application claims priority to U.S. Provisional Application No. 63/188,175, filed on May 13, 2021, which is incorporated by reference herein in its entirety.

BACKGROUND

A graph is a data structure that has nodes, or vertices, that are connected to other nodes by edges. Each node and/or edge may also be associated with additional data values. Graph analytics is a popular application domain because many machine learning, data mining and scientific computation can be modeled as graph-structured computation. For example, large graph datasets can be used for representing relationships between people in a social network, modeling interactions between different molecules for drug synthesis, generating recommendations, etc.

One dimension affecting the performance and cost of graph analytics is the size of the graph dataset. Very large graph datasets are often distributed over multiple memory devices, and the computations associated with such large graph datasets are performed by multiple computing nodes in a system. However, scaling a graph computing system in this manner can result in problems such as performance bottlenecks (e.g., due to increased communication latency) and lack of flexibility and uniformity.

BRIEF DESCRIPTION OF THE DRAWINGS

The present disclosure is illustrated by way of example, and not by way of limitation, in the figures of the accompanying drawings.

DETAILED DESCRIPTION

Figure 1:
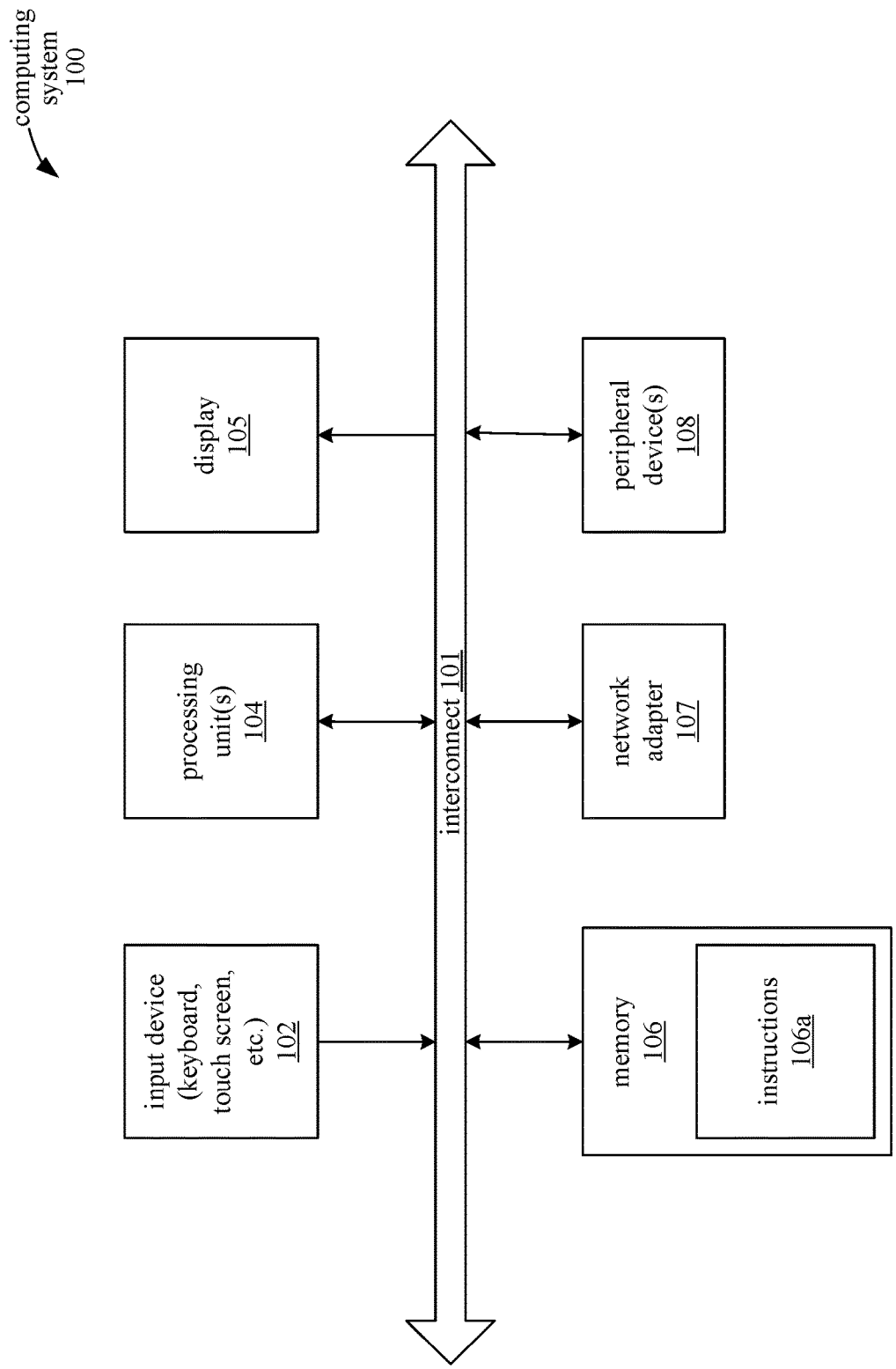
FIG. 1 illustrates an embodiment of a computing system implementing graph processing accelerator devices.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

Graph processing and graph analytics is an extremely popular application space in modern data centers, and encompasses a wide variety of applications including social network analysis, recommendation systems, drug synthesis, etc. Providing a scalable hardware solution that is simple to program can facilitate deployment of these applications on a variety of computing platforms. Graph processing is compute and memory intensive and can benefit from purpose built hardware accelerators; however, existing approaches are associated with a high degree of non-recurring engineering (NRE) since hardware solutions tailored to address specific processing bottlenecks result in different software and programming interfaces.

In addition, processing of larger graphs means that the graph data is physically located over a wider area in the computing system, as compared to smaller graphs. The effectiveness of accelerator hardware may be impacted when the accelerator hardware is located farther away from the data; however, placement of accelerator functionality in different parts of the system can also lead to differences in hardware (and consequently, the software/programming interface) in order for the accelerator to be optimized for operating in a particular location.

In one embodiment, a graph-processing accelerator architecture processes graph data as close as possible to where the graph data being processed resides in memory, and can be located at a variety of different locations in the overall computing system, including and not limited to central processing unit (CPU)-attached, network-attached, memory-attached, storage-attached locations, etc. The accelerator architecture is scalable, allowing for different performance levels when instantiated in different parts of the system; however, the programming interface for accessing the accelerator's functions remains constant regardless of the specific microarchitecture, so that writing software for accelerator is significantly easier and more scalable. In one embodiment, a graph processing accelerator includes a single-instruction multiple data (SIMD) or systolic-array-based throughput processing unit (or vector processing unit) to perform matrix arithmetic, a vertex processing unit for manipulating the structure (i.e., nodes and edges) of the graph data, a format shuffle unit to convert sparse matrices between different sparse representations, a programmable gather/scatter unit, and a general purpose CPU.

FIG. 1 illustrates an embodiment of a computing system 100 which includes the graph-processing accelerators as described above. In general, the computing system 100 is embodied as any of a number of different types of devices, including but not limited to a laptop or desktop computer, mobile phone, server, datacenter, etc. The computing system 100 includes a number of components 102-108 that can communicate with each other through an interconnect 101. In computing system 100, each of the components 102-108 is capable of communicating with any of the other components 102-108 either directly through the interconnect 101, or via one or more of the other components 102-108. The components 101-108 in computing system 100 are contained within a single physical casing, such as a laptop or desktop chassis, or a mobile phone casing. In alternative embodiments, some of the components of computing system 100 are embodied as peripheral devices such that the entire computing system 100 does not reside within a single physical casing.

The computing system 100 may also include user interface devices for receiving information from or providing information to a user. Specifically, the computing system 100 may include an input device 102, such as a keyboard, mouse, touch-screen, or other device for receiving information from the user. The computing system 100 displays information to the user via a display 105, such as a monitor, light-emitting diode (LED) display, liquid crystal display, or other output device.

Computing system 100 additionally includes a network adapter 107 for transmitting and receiving data over a wired or wireless network. Computing system 100 also includes one or more peripheral devices 108. The peripheral devices 108 include mass storage devices, location detection devices, sensors, input devices, or other types of devices that can be used by the computing system 100.

Computing system 100 includes one or more processing unit(s) 104 that can receive and execute instructions 106a that are stored in the main memory 106 or in other memory devices (e.g., memory local to one or more of the processing unit(s) 104). As referenced herein, processing unit(s) 104 represents one or more processor "pipelines", and could include central processing unit (CPU) pipelines, graphics processing unit (GPU) pipelines, or other computing engines. Main memory 106 is part of a memory subsystem of the computing system 100 that includes memory devices used by the computing system 100, such as random-access memory (RAM) modules, read-only memory (ROM) modules, hard disks, and other non-transitory computer-readable media. In addition to the main memory 106, the memory subsystem also includes cache memories, such as L2 or L3 caches, and/or registers. Such cache memory and registers are present in the processing unit(s) 104 or on other components of the computing system 100.

Figure 2:
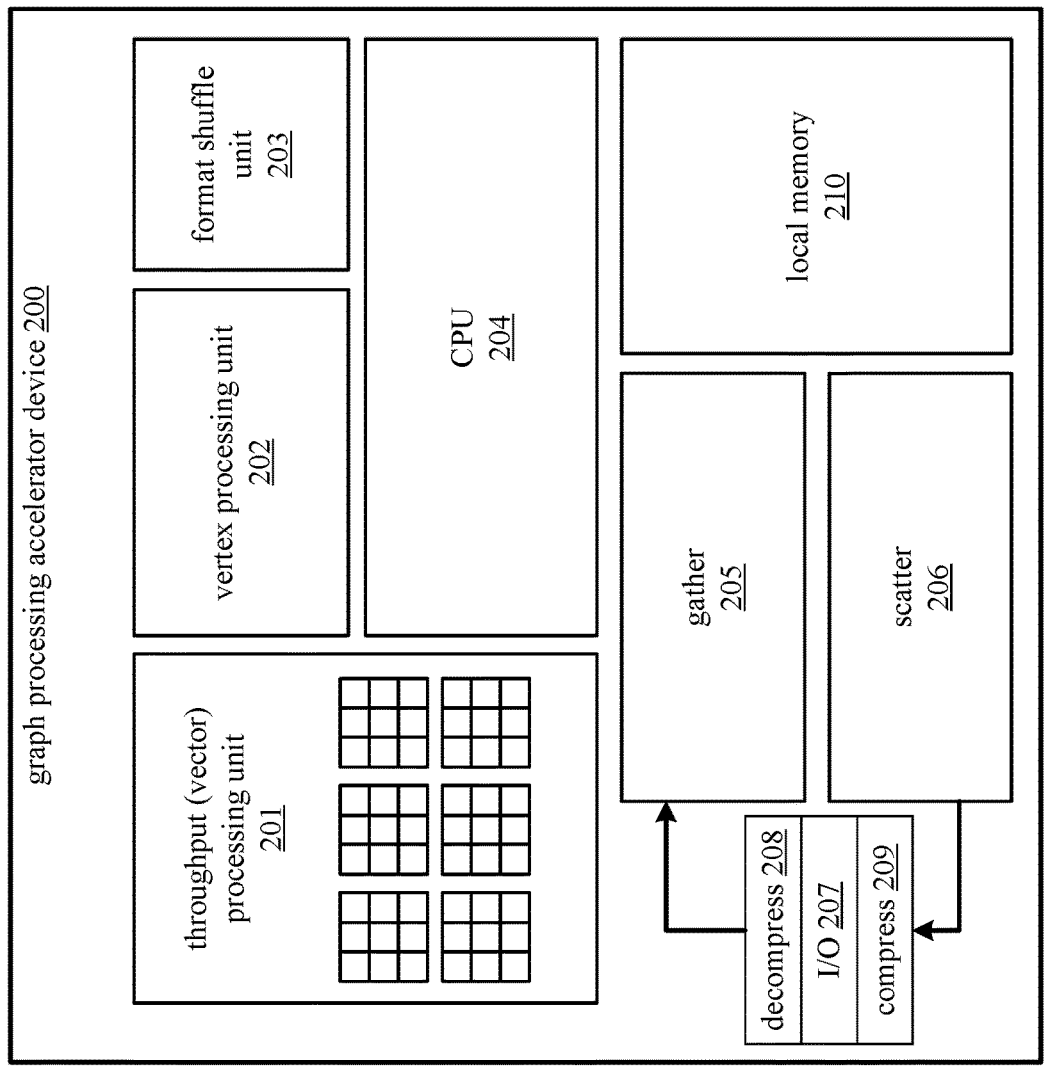
FIG. 2 illustrates an embodiment graph processing accelerator device.

FIG. 2 illustrates an embodiment of a graph processing accelerator device 200 that is deployed in the computing system 100. The accelerator device 200 can be deployed at multiple levels of the system hierarchy, with the same functionality exposed at every location in the system hierarchy, thus simplifying the software interface and the programming of the accelerator. The circuit components in the accelerator device 200 include processing units 201-204, local memory 210, and memory interface modules 205-209. The processing units 201-203 contain specialized hardware functional units (e.g., in a systolic array arrangement) for performing specific graph processing tasks. In one embodiment, computations performed in the functional units are carried out in circuitry without execution of any program code.

The throughput processing unit 201 (or vector processing unit) is a processing unit that performs computations based on the data values in graph datasets, such as arithmetic and linear algebra operations. In one embodiment, the throughput processing unit 201 performs linear algebra primitive functions for tensor processing including, but not limited to:
  Matrix-matrix multiplications
  Vector-matrix multiplications
  Matrix-vector multiplication
  Element-wise multiplication of vectors and matrices
  Element-wise addition of vectors and matrices
  Selecting/extracting a subgraph in the form of a tensor or other formats
  Assigning a value of a subgraph in the form of a tensor
  Applying a function to a subgraph in the form of a tensor
  Reducing a matrix to a vector or a vector to an element
  Transposing a matrix
  Calculating a Kronecker product or other, similar, outer product between two matrices In one embodiment, the throughput unit 201 is implemented using a single instruction, multiple data (SIMD) architecture, or one or more systolic arrays of functional units for performing the above primitive functions.

The vertex processing unit 202 contains functional units for accessing and/or modifying a structure of a graph dataset (i.e., the nodes/vertices, edges, and properties or metadata associated with nodes and/or edges). In one embodiment, the vertex processing unit 202 supports graph manipulation primitive functions including, but not limited to:
  Adding/removing vertices
  Query-based filtering, partitioning by a given strategy
  Grouping together edges
  Combining edges
  Grouping together vertices
  Combining vertices
  Collecting neighboring node identifiers (IDs)
  Collecting connected components
  Reversing (transposing) a graph
  Collecting a subgraph from a graph based on a filter
  Masking subnodes in a graph based on a filter
  Node value aggregation Additionally, embodiments may support primitive operations on an underlying matrix representation of the graph including, but not limited to, the following:
  Resizing the matrix
  Clearing the matrix
  Removing or extracting elements
  Setting the value of an element The accelerator device 200 also includes a format shuffle unit 203 that includes computational hardware for converting sparse matrices or other data structure types between different sparse representations. The format shuffle unit 203 is capable of converting at least a portion of the graph dataset from a first representation to a second representation. In one embodiment, the format shuffle unit 203 supports the following conversion operations:
  Conversion between various sparse tensor representation formats such as compressed sparse row (CSR), compressed sparse column (CSC), coordinate list (COO), hierarchical coordinate (HiCOO), ELLPACK (ELL), and sliced ELLPACK (SELL-C-sigma).
  Conversion between sparse tensor representations and a dense representation and vice-versa.
  Conversion between various graph representations such as adjacency lists, adjacency matrices, and edge lists.
  Conversion between compressed representations and uncompressed representations.

The above processing components 201-203 include specialized hardware for performing their respective tasks. For a given accelerator device that includes a particular processing unit type, the tasks for which the included processing unit is optimized are performed primarily by the specialized hardware in that processing unit. For example, an accelerator device that includes a vertex processing unit 202 primarily performs graph data structure manipulation in the vertex processing unit 202 rather than in other components.

In one embodiment of a computing system 100, each graph processing accelerator in the system 100 supports the same base set of primitive functions; however, a given accelerator device in the system 100 need not include all of the processing unit types 201-203. Tasks for which the given accelerator device 200 does not include specialized hardware are instead performed by the CPU 204 (e.g., an x86 CPU). For example, a graph processing accelerator device that does not include a specialized vertex processing unit 202 performs graph data structure manipulation in the CPU 204. However, at least some tasks will be performed by one of the specialized processing units 201-203 having hardware optimized for the tasks that the accelerator device 200 does include.

In an example computing system 100, each graph processing accelerator device 200 in the system 100 includes a CPU 204 and at least one of the processing units 201-203. Each of the accelerator devices 200 supports at least the same base set of graph processing primitive functions implemented in the specialized hardware of the processing units 201-203 and the general CPU 204 (when the specialized hardware for the function is not included). Various embodiments of the accelerator 200 can support fewer or more primitive functions than those listed above.

The memory interface portion of the accelerator device 200 includes one or more of: programmable gather 205 and scatter 206 units, input/output module 207, and compression 209 and decompression 208 units. The gather unit 205 is capable of retrieving data from a sparse range of memory locations, and the scatter unit 206 is capable of scattering (i.e., storing data) over a sparse range of memory locations. The gather unit 205 obtains a portion of a graph dataset from multiple memory locations (e.g., different memory devices) in the system 100 via the I/O module 207. The data can be received at the I/O module 207 in compressed form, and is decompressed in the decompression unit 208. The gather unit 205 stores the decompressed graph data in the local memory 210 where it can be accessed by the processing units 201-204 for their computations.

The scatter unit 206 sends a portion of the graph dataset to be stored in one or more remote memory devices in the system 100. In one embodiment, the scatter unit 206 obtains data (e.g., data resulting from computations performed by the processing units 201-204) to be stored in the remote memory devices from the local memory 210. The data can be compressed in the compression unit 209 and then transmitted via the I/O module 207 to the destination memory devices via the interconnect 101.

Figure 3:
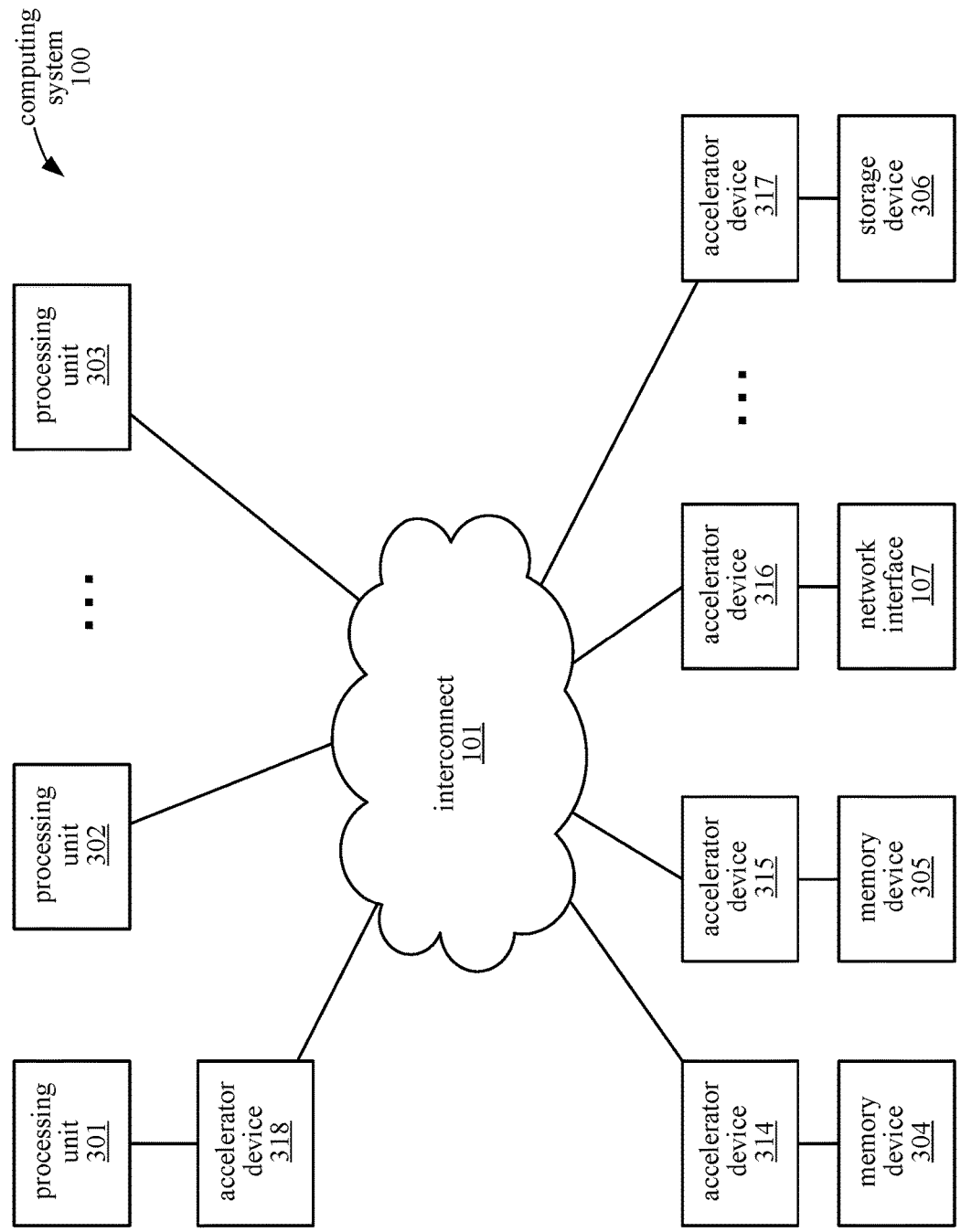
FIG. 3 illustrates graph processing accelerator devices deployed in a computing system, according to an embodiment.

FIG. 3 illustrates graph processing accelerator devices at different locations in a computing system 100, according to an embodiment. FIG. 3 additionally illustrates multiple processing units 301-303 (corresponding to processing unit(s) 104), multiple memory devices 304 and 305 (corresponding to memory 106), storage device 306 (i.e., one of the peripheral device(s) 108), and graph processing accelerator devices 314-318 in various locations in the computing system 100. Each of the accelerator devices 314-318 is implemented by a device such as the accelerator device 200, but may include all or a subset of the processing units 201-203 and all or a subset of components 205-209. The set of graph processing accelerator devices 314-318 includes a processor-attached accelerator 318, memory-attached accelerators 314 and 315, network attached accelerator 316, and storage-attached accelerator 317.

Each of the accelerator devices 314-318 includes a gather unit 205 and a scatter unit 206. In the computing system 100, a graph dataset is stored across multiple memory devices, including memory devices 304 and 305 and other memory devices not illustrated, which each store a portion of the complete graph dataset. The gather unit 205 in an accelerator device obtains a portion of the graph dataset from one or more of the memory devices via the interconnect 101 so that the portion can be processed in the accelerator device. When the processing of the graph data is complete, the scatter unit 206 sends the processed portion of the graph data via the interconnect 101 to be stored in the memory devices. In one embodiment, each accelerator device 314-318 operates on graph data that is located closest to it. For example, the accelerator device 314 operates primarily on the portion of the graph dataset that is stored in its local memory device 304, since the accelerator device 314 is closer to the memory device 304 than to any other memory device (e.g., memory device 305) in the system 100. In other words, a majority of the computations performed in the accelerator device 314 are on the graph data stored in memory device 304 rather than any other memory device.

Some or all of the accelerator devices 314-318 have components (e.g., vector processing unit, vertex processing unit, format shuffle, etc.) with different throughput and/or bandwidth capabilities that are optimized depending on factors such as the location of the accelerator device, the proximity of the accelerator device to certain other devices or components, the application being run, etc. In one embodiment, each of the accelerator devices is capable of performing the same set of functions (e.g., the previously described primitive graph processing functions), which are accessible via the same common software/programming interface regardless of the differing individual hardware configurations of the accelerators 314-318.

Scalability of the accelerator devices 314-318 is achieved by scaling the individual components to optimize for certain parts of the graph application. This can be accomplished by increasing the size or capacity of one or more of the processing units 201-203 by, for example, including a larger number of functional units, memory, or other hardware resources in the processing unit. Accordingly, different accelerator devices in the system 100 can have different performance capabilities for the same functions. For example, one of the processing units 201-203 for performing a particular function on the graph dataset in a first accelerator device may have a greater number of functional units and/or other hardware resources, and therefore has a greater throughput capability (i.e., can process more data in a given time) than the corresponding processing unit having a smaller set of functional units and fewer hardware resources for performing the same function in a second accelerator device.

In some embodiments, a particular function in one accelerator device is performed by executing program code in its CPU 204, while in another accelerator device, the same function is performed in one or more hardware functional units. For example, a vector processing unit 202 in a first accelerator device includes hardware functional units for adding and removing vertices edges in the graph dataset, while the same first accelerator device lacks a throughput processing unit 201 and performs computations on graph data values (e.g., arithmetic and linear algebra) by executing program code in the CPU 204 for performing the computations. In contrast, a second accelerator device in the same computing system 100 lacks a vertex processing unit 202 and executes program code in its CPU 204 for adding and removing vertices and edges in the graph dataset, while the same second accelerator device has a throughput processing unit 201 that includes an array of hardware functional units for performing the arithmetic, linear algebra, and other computations. Thus these accelerator devices support the same functions, though the functions are performed in different hardware and with different performance characteristics.

In one embodiment, the performance capabilities of the accelerator devices 314-318 are optimized depending on their locations in the system 100. For example, when specific data is requested from a long-term storage device (e.g., from an accelerator 317 residing close to the storage device 306), it is more likely that more parallel memory requests will be processed and more query filters will be performed in order to make sure that the right set of data is collected before being sent to another part of the system. As such, the vertex processing unit 202 of the local accelerator device 317 and gather 205 and scatter 206 units are sized up, with additional functional units and processing capacity, while the throughput processing unit 201 are sized down or eliminated, with its functionality implemented by software running on the CPU 204. Since the accelerator 317 is close to and has greater access to one portion of the graph data while having less access to other portions of the graph data, it is more difficult for the accelerator 317 to access an overall view of the graph data which would be used for performing linear algebra computations. Instead, its primary role would be gathering data.

In another example, a graph processing accelerator 318 instantiated close to a main compute device, processing unit 301, is not exposed to a relatively large amount of data, but is primarily occupied with computations (e.g., linear algebra, arithmetic, etc.) for the application being run. Accordingly, the accelerator device 318 has a larger and more capable throughput processing unit 201, and smaller vertex processing unit 202 (since the graph will not be modified as much) and smaller gather/scatter units 205/206.

Figure 4B:
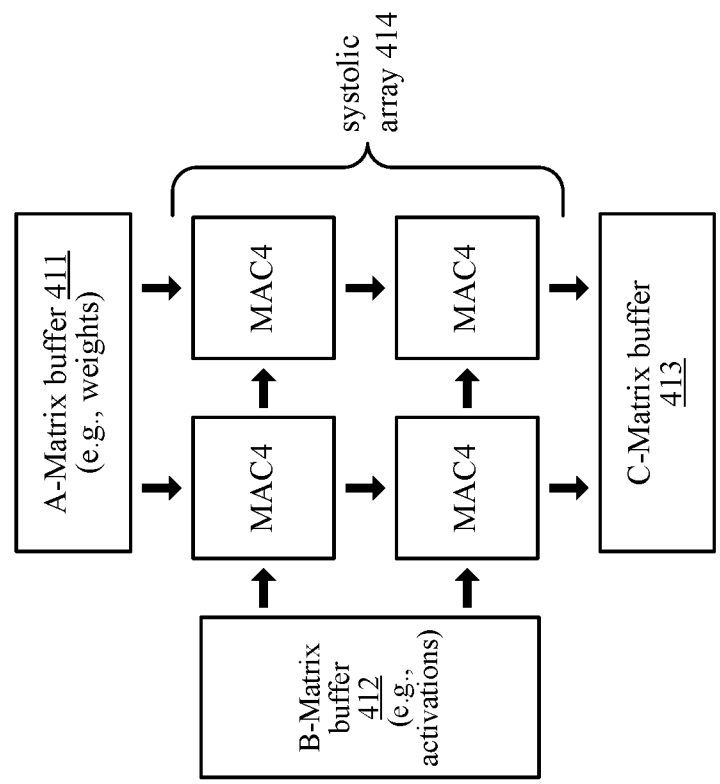
FIG. 4B illustrates a systolic array of functional units in a throughput processing unit, according to an embodiment.
Figure 4A:
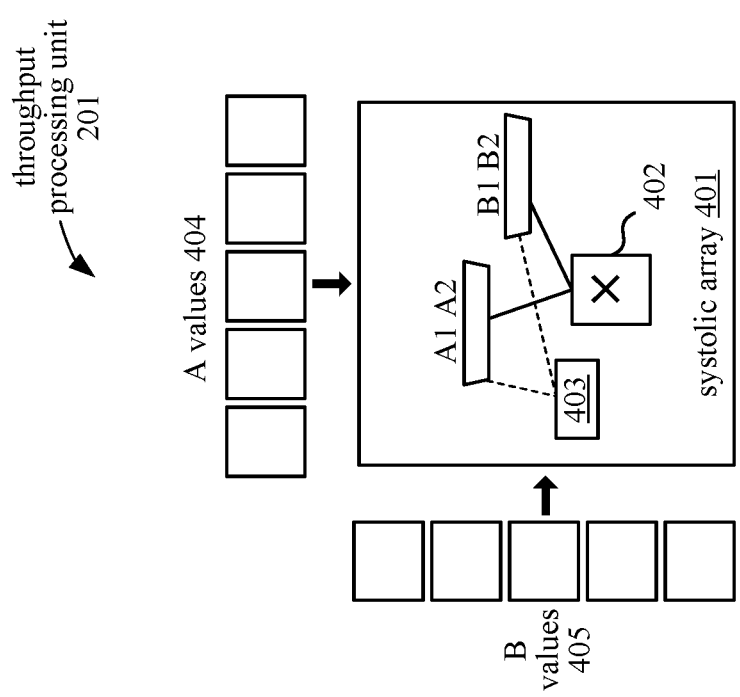
FIG. 4A illustrates a systolic array of functional units in a throughput processing unit, according to an embodiment.

FIG. 4A illustrates a throughput processing unit 201 including a systolic array of functional units, according to an embodiment. The throughput processing unit 201 accelerates arithmetic and linear algebra operations for the graph dataset. In particular, the throughput processing unit 201 includes specialized hardware for accelerating such computations for sparse applications, in which there are many zeroes in the graph dataset. As illustrated in FIG. 4A, the throughput processing unit 201 includes a systolic array 401 of functional units for performing the computations. The systolic array 401 is an array of 4-wide multiply-add functional units. The systolic array 401 receives two sets of values, the A values 404 and the B values 405, and multiplies each of the A values 404 with each of the B values 405. Alternative embodiments can include fewer or more functional units, with different widths and/or functions. For sparse computations, each of the functional units also includes zero detection circuitry for skipping one or more zero-operand computations, which have zero as one of their operands.

For example, when the multiply unit 402 receives two inputs, A and B, to produce a product C, optimizations can be performed to elide the computations of any zero-valued products. In this case, rather than providing two scalar values A and B, two possible pairs of operands are provided to the multiplier, (A1, B1) and (A2, B2). Either the "1" operands (i.e., A1 and B1) or the "2" operands (i.e., A2 and B2) are actually multiplied together, depending on which pair consists of two non-zero values. Additional buffering is provided for the minority case where both the "1" set and "2" set of operands have two non-zero values. For a sparse data set, likely no more than one of the pairs will consist of two nonzero values, so the results for both pairs likely can be determined using the zero detection circuitry 403 and a single multiplier unit 402. In this case, the zero detection circuitry 403 selects the set of operands that are both nonzero values to be multiplied together, and the product of the other set is zero. If each set of operands has at least one zero operand, then both products are zero. If each set of operands has two nonzero operands, then one set is multiplied in a first cycle, and the second set is buffered during the first cycle and multiplied in a subsequent cycle.

FIG. 4B illustrates an embodiment of a systolic array for performing matrix multiplication operations, in the context of a neural network computation, on a set of weights (stored in the A-Matrix buffer 411) and activations (stored in the B-Matrix buffer 412), with the results stored in the C-Matrix buffer 413. Each of the multiply/accumulate units (MAC4) in the systolic array 414 receives four inputs from the A-Matrix 411 and four inputs from the B-Matrix 412; thus, the array 414 of MAC4 units receives a total of eight inputs from the A-Matrix 411 and eight inputs from the B-Matrix 412, or eight pairs of operands. In one embodiment, zero detection logic is incorporated into the MAC4 units to apply the approach illustrated in FIG. 4A. For multiplying sufficiently sparse data, no more than four of the eight pairs of operands will include two nonzero values in most cases. Thus, the four MAC4 units are usually sufficient to perform the computations for the eight pairs of operands in a single cycle. The MAC4 units compute the products for the nonzero pairs of operands, and the multiply results for pairs that have at least one zero operand are set to zero.

Figure 4C:
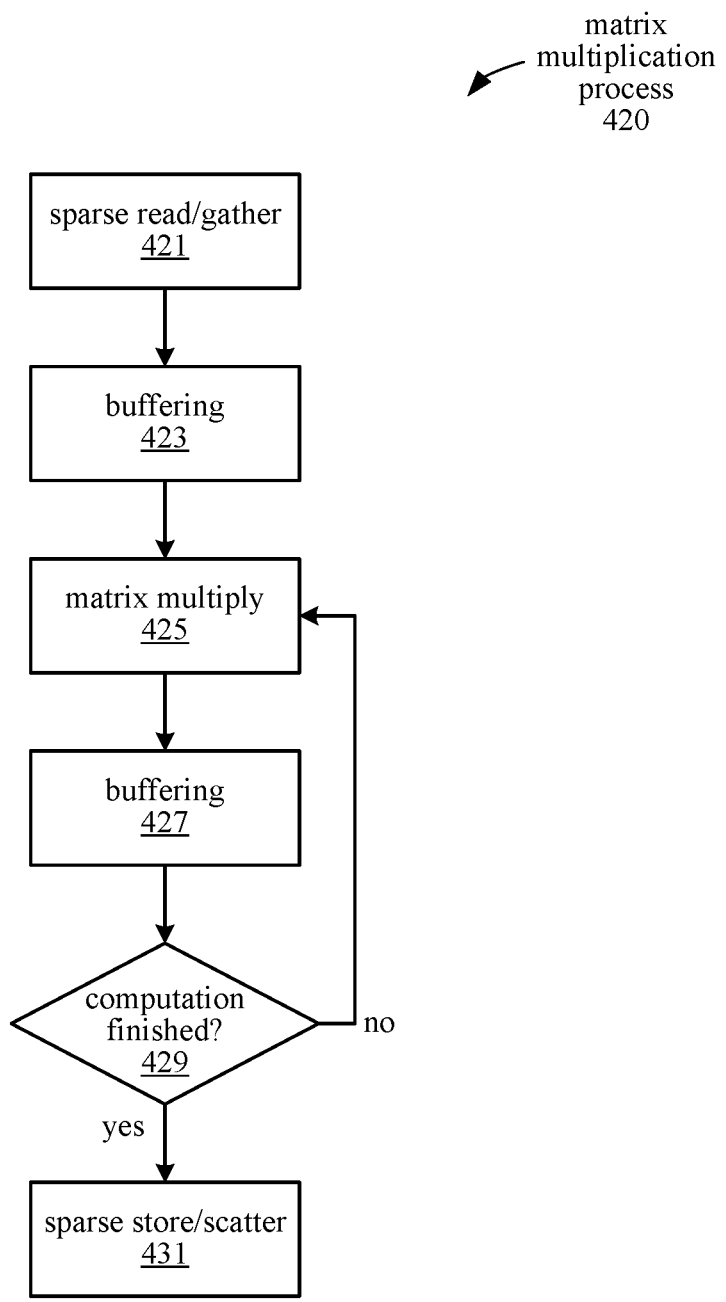
FIG. 4C illustrates a process of performing matrix multiplication in a throughput processing unit, according to an embodiment.

FIG. 4C illustrates a flow chart showing a process 420 for performing matrix multiplication in an embodiment of the graph processing accelerator 200. The matrix multiplication process 420 is performed in the components of a throughput processing unit 201 as illustrated in FIGS. 2 and 4B. At block 421, a sparse read/gather operation is performed by the gather unit 205 to retrieve graph data from one or more memory devices in the system 100. At block 423, the gathered data is stored in the A-Matrix 411 and B-Matrix 412 buffers. The matrix multiplication is carried out in the systolic array 414 of MAC4 units, as provided at block 425, and the results are buffered in the C-Matrix buffer 413 at block 427. At block 429, if the computation is not yet complete, then the results in the C-Matrix buffer 414 are used as inputs to the MAC4 units in one or more subsequent iterations, to be multiplied with new incoming data, as the process 420 returns to block 425. When the computation is complete, the process 420 continues from block 429 to block 431. At block 431, the final data (i.e., the computation result) is stored back into memory by the scatter unit 206.

Figure 5:
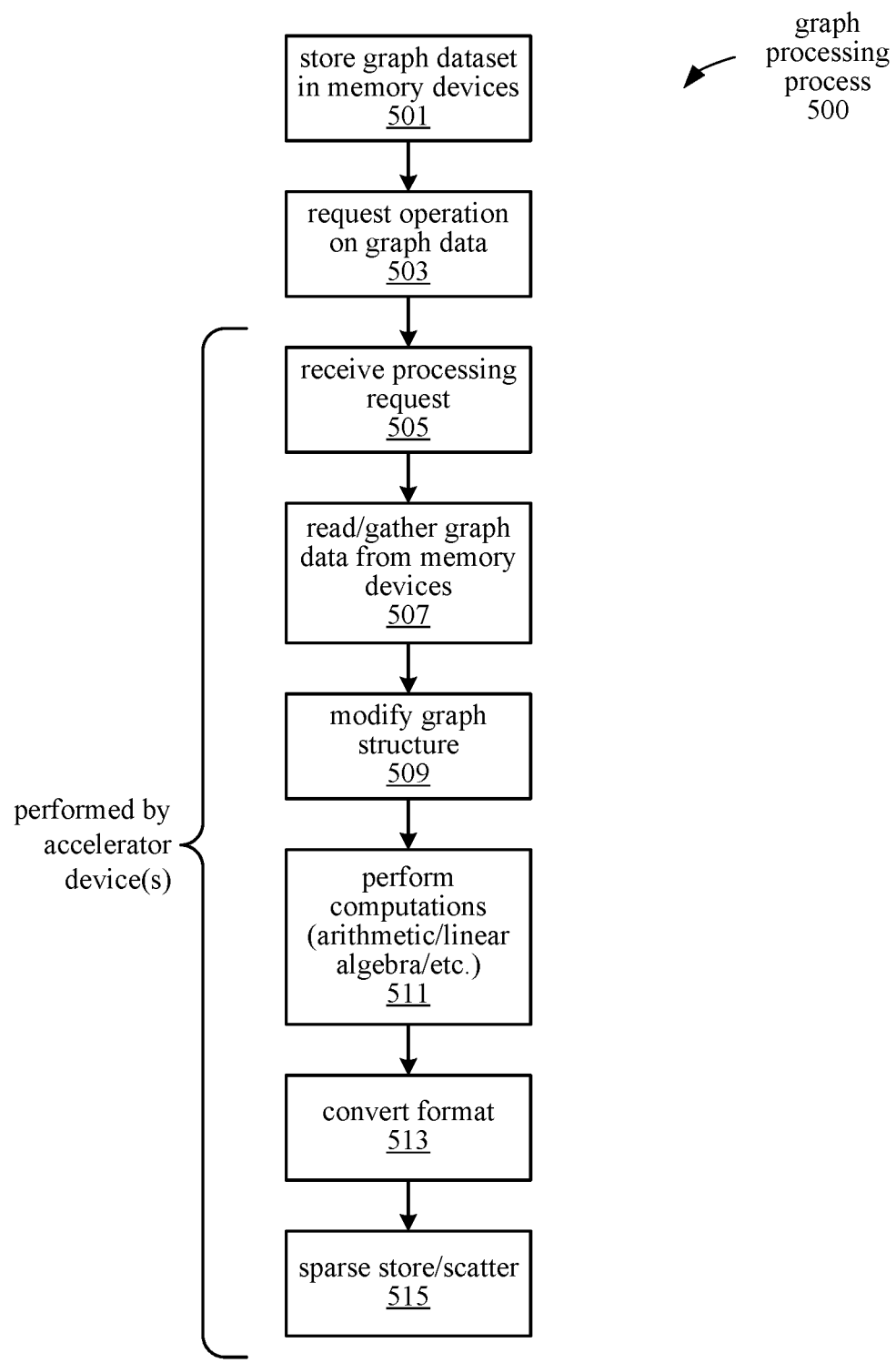
FIG. 5 illustrates a process of processing graph data in a computing system implementing graph processing accelerator devices, according to an embodiment.

FIG. 5 illustrates a graph processing process 500 for performing operations on a graph dataset, according to an embodiment. The process 500 is performed by components in the computing system 100, including the memory 106 and the graph processing accelerators 314-318.

At block 501, the data in a graph dataset is stored across multiple memory devices (e.g., memory devices 304 and 305) in the computing system 100. The graph dataset defines nodes (or vertices) and edges, along with relationships between the nodes and edges. The graph dataset also includes data values associated with the nodes and/or edges, and can be stored in an uncompressed format or a compressed format such as CSR, CSC, ELLPACK, etc. At block 503, one of the processing units 301-303 requests that an operation be performed on the graph data. The processing unit executes program code that specifies the operation and the graph data on which the operation is to be performed according to the common programming interface for the graph processing accelerator devices 314-318. The request is transmitted via the interconnect 101 to one or more of the accelerator devices 314-318.

Blocks 505-515 are performed in one or more of the accelerator devices 314-318, represented generally by accelerator device 200. In particular, the operations of blocks 505-515 are performed by components such as the processing units 201-204, gather and scatter units 205-206, etc.

At block 505, the accelerator device 200 receives the request to perform an operation on the graph data stored in the memory devices 106. The request is received from the interconnect 101 by the I/O module 207. At block 507, the gather unit 205 responds to the request by reading the graph data on which the requested operation will be performed. The gather unit 205 requests the data from the memory devices 106, and the data is transmitted from memory 106 via the interconnect 101 and is received at the I/O module 207 in compressed form. The data is decompressed in the decompression unit 208 and the gather unit 205 stores the data in the local memory 210 where it can be accessed by the processing units 201-204. The graph data represents structural features of the graph (e.g., nodes/vertices, edges, etc.) and data values associated with the structural features.

The gathered data is processed according to the request, as provided in one or more of blocks 508-513. Depending on the requested operation or operations, the process 500 may include some or all of the blocks 508-513. If the requested operation involves modification of the graph structure (e.g., addition or removal of a node or edge, etc.), then the structure of the graph dataset is modified as provided at block 509. Depending on the hardware configuration of the accelerator device in which the operation is performed, the modification of the graph structure is performed in a set of functional units in the vertex processing unit 202 or, if the accelerator device does not include a vertex processing unit 202, the operation is performed in the CPU 204, which executes program code for performing the modification. The modified graph data is stored in the local memory 210.

If the requested operation involves computations based on data values in the graph dataset, such as arithmetic, linear algebra, or other calculations, then the computations are performed as provided at block 511. Depending on the hardware configuration of the accelerator device, the computations are performed in a set of functional units in the throughput processing unit 201 or, if the accelerator device does not include a throughput processing unit 201, the computations are performed in the CPU 204, which executes program code for performing the computations. As an example, blocks 423-429 in FIG. 4C correspond to block 511 in the process 500.

If the requested operation involves converting the graph data from one tensor representation format (e.g., CSR, CSC, COO, etc.) to another tensor representation format, then the conversion is performed as provided at block 513. Depending on the hardware configuration of the accelerator device, the computations are performed in a set of functional units in the format shuffle unit 203 or, if the accelerator device does not include a format shuffle unit 203, the conversion is performed in the CPU 204, which executes program code for performing the conversion.

Once the requested operation is completed in one or more of blocks 509-513 the modified graph data is stored in the local memory 210. The process 500 continues at block 515, at which the scatter unit 206 sends the modified graph data to be stored in the memory devices 106. The scatter unit 206 obtains the modified graph data from the local memory 210 and the graph data is compressed in the compression unit 209. The compressed version of the data is sent by the I/O module 207 to the memory devices 106 via the interconnect 101. The process 500 repeats for each operation that is requested on the graph data. The accelerator devices 314-318 in the system 100 thus facilitate processing of the graph dataset while providing a unified software programming interface for accessing the supported accelerator functions and maintaining a high degree of scalability and flexibility.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing system 100 and/or portions thereof carried on the computer-readable storage medium may be a database or other data structure which can be read by a program and used, directly or indirectly, to fabricate the hardware including the computing system 100. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing system 100. The netlist may then be placed and routed to produce a data set describing geometric shapes to be applied to masks. The masks may then be used in various semiconductor fabrication steps to produce a semiconductor circuit or circuits corresponding to the computing system 100. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. An accelerator device, comprising:
a first processing unit configured to execute program code to modify a structure of a graph dataset by adding and removing vertices and adding and removing edges of the graph dataset; and
a second processing unit coupled with the first processing unit and comprising a set of hardware functional units configured to perform computations based on data values in the modified graph dataset by performing one or more arithmetic operations on the data values.

2. The accelerator device of claim 1, wherein:
the first processing unit comprises a central processing unit; and
the second processing unit comprises a throughput processing unit comprising the set of hardware functional units.

3. The accelerator device of claim 2, wherein:
the second processing unit comprises a systolic array of the set of hardware functional units.

4. The accelerator device of claim 2, wherein:
each hardware functional unit of the set of hardware functional units comprises zero detection circuitry configured for skipping one or more zero-operand computations.

5. The accelerator device of claim 1, further comprising:
a gather unit configured to obtain a first portion of the graph dataset from a plurality of memory devices; and
a scatter unit configured to send a second portion of the graph dataset to the plurality of memory devices.

6. The accelerator device of claim 1, further comprising:
a format shuffle unit configured to convert a portion of the graph dataset from a first representation to a second representation.

7. A method, comprising:
storing a graph dataset in a set of memory devices;
in a set of hardware functional units of a first processing unit of an accelerator device, modifying a structure of the graph dataset by adding and removing vertices and adding and removing edges of the graph dataset; and
in a second processing unit of the accelerator device, performing computations based on data values in the modified graph dataset by executing program code for performing one or more arithmetic operations on the data values.

8. The method of claim 7, wherein:
the set of hardware functional units comprises a vertex processing unit of the first processing unit.

9. The method of claim 7, wherein:
performing the computations comprises, in a set of functional units in the second processing unit, performing one or more arithmetic operations on the data values; and
accessing and modifying the structure of the graph dataset comprises, in the first processing unit in the accelerator device, executing program code for adding or removing one or more vertices in the graph dataset, and adding or removing one or more edges in the graph dataset.

10. The method of claim 7, further comprising:
in a format shuffle unit in the accelerator device, converting a portion of the graph dataset from a first representation to a second representation.

11. The method of claim 7, further comprising:
obtaining a first portion of the graph dataset from a plurality of memory devices; and
sending a second portion of the graph dataset to the plurality of memory devices.

12. A computing system, comprising:
a plurality of memory devices, each storing a portion of a graph dataset; and
a plurality of accelerator devices coupled with the plurality of memory devices, wherein each accelerator device of the plurality of accelerator devices comprises:
a first processing unit comprising a set of hardware functional units configured to access and modify a structure of the graph dataset by adding and removing vertices and edges of the graph dataset, and
a second processing unit configured to execute program code to perform computations based on data values of the modified graph dataset.

13. The computing system of claim 12, wherein the first processing unit of each accelerator device of the plurality of accelerator devices further comprises
a vertex processing unit configured for modifying a structure of the graph dataset; and
the second processing unit of each accelerator device of the plurality of accelerator devices comprises a throughput processing unit configured for performing one or more arithmetic operations on data values of the modified graph dataset.

14. The computing system of claim 12, wherein:
for a first accelerator device of the plurality of accelerator devices and a second accelerator device of the plurality of accelerator devices having different hardware configurations,
the first accelerator device is configured for performing a same function set as the second accelerator device, and
the function set is accessible via a common programming interface in both of the first accelerator device and the second accelerator device.

15. The computing system of claim 12, wherein:
a first set of functional units for performing a function on the graph dataset in a first accelerator device of the plurality of accelerator devices has a greater throughput capability than a second set of functional units for performing the function in a second accelerator device of the plurality of accelerator devices.

16. The computing system of claim 12, wherein:
a first accelerator device of the plurality of accelerator devices is configured to perform a function on the graph dataset by executing program code in a processing unit, and
a second accelerator device of the plurality of accelerator devices is configured to perform the function in one or more circuits.

17. The computing system of claim 12, wherein:
each accelerator device is configured to operate on the portion of the graph dataset stored in a local memory device of the plurality of memory devices, wherein the local memory device is closer to the accelerator device than any other memory device of the plurality of memory devices.

18. The computing system of claim 12, wherein:
each accelerator device of the plurality of accelerator devices further comprises a systolic array of functional units configured to perform the computations, and
each systolic array of functional units comprises zero detection circuitry configured for skipping one or more zero-operand computations.

19. The computing system of claim 12, wherein each accelerator device of the plurality of accelerator devices further comprises:
a gather unit configured to obtain a first portion of the graph dataset from the plurality of memory devices; and
a scatter unit configured to send a second portion of the graph dataset to the plurality of memory devices.

20. An accelerator device, comprising:
a first processing unit comprising a set of hardware functional units configured to modify a structure of a graph dataset by adding and removing vertices and adding and removing edges of the graph dataset; and
a second processing unit coupled with the first processing unit and comprising a set of hardware functional units configured to perform computations based on data values in the modified graph dataset.

21. An accelerator device, comprising:
a first processing unit configured to execute program code to modify a structure of a graph dataset by adding and removing vertices and adding and removing edges of the graph dataset; and
a second processing unit coupled with the first processing unit and configured to execute program code to perform computations based on data values in the modified graph dataset.

* * * * *